(12) United States Patent
Gangadharappa et al.

(10) Patent No.: US 9,026,997 B2
(45) Date of Patent: May 5, 2015

(54) SYSTEMS AND METHODS FOR EXECUTING OBJECT-ORIENTED PROGRAMMING CODE INVOKING PRE-EXISTING OBJECTS

(75) Inventors: Kiran K. Gangadharappa, Mountain View, CA (US); Apurv R. Jawle, Fremont, CA (US)

(73) Assignee: SAP AG, Walldorf (DE)

( * ) Notice: Subject to any disclaimer, the term of this patent is extended or adjusted under 35 U.S.C. 154(b) by 1345 days.

(21) Appl. No.: 12/336,498

(22) Filed: Dec. 16, 2008

(65) Prior Publication Data

US 2010/0153913 A1    Jun. 17, 2010

(51) Int. Cl.
*G06F 9/44*        (2006.01)

(52) U.S. Cl.
CPC ... *G06F 9/44* (2013.01); *G06F 8/00* (2013.01)

(58) Field of Classification Search
CPC .................................................. G06F 11/3664
See application file for complete search history.

(56) References Cited

U.S. PATENT DOCUMENTS

| | | | |
|---|---|---|---|
| 7,529,780 B1* | 5/2009 | Braginsky et al. | 1/1 |
| 2002/0066071 A1* | 5/2002 | Tien et al. | 717/102 |
| 2004/0193682 A1* | 9/2004 | Deboer et al. | 709/203 |
| 2007/0061700 A1* | 3/2007 | Kothari et al. | 715/505 |
| 2008/0195651 A1* | 8/2008 | Rachmiel et al. | 707/102 |
| 2010/0050160 A1* | 2/2010 | Balasubramanian | 717/126 |

* cited by examiner

*Primary Examiner* — Li B Zhen
*Assistant Examiner* — Lenin Paulino
(74) *Attorney, Agent, or Firm* — Finnegan, Henderson, Farabow, Garrett & Dunner, LLP

(57) ABSTRACT

Methods, computer-readable media, and systems are provided for executing programming code. In one embodiment, a server may store running objects to be used by the programming code. The server may provide a code development console through which the programming code may be input at a remote terminal. The server may receive the programming code inputted into the code development console, execute the programming code by using operations of the running objects, and transmit an execution result of the programming code to the remote terminal for display in the code development console.

18 Claims, 7 Drawing Sheets

SYSTEMS AND METHODS FOR EXECUTING OBJECT-ORIENTED PROGRAMMING CODE INVOKING PRE-EXISTING OBJECTS

BACKGROUND

1. Technical Field

Systems and methods consistent with the present invention generally relate to techniques for executing object oriented computer programming code. More particularly, systems and methods consistent with the invention relate to executing code that invokes or relies on at least one pre-existing object.

2. Background Information

Developing software applications using object oriented computer programming code can get very complex. For example, an object oriented computer program may rely on operations of multiple pre-existing objects. The operation of such objects may refer to any fields, properties, or methods of an object of a certain class. Further, each object may be exemplars of classes from existing class libraries, classes created for other applications, etc. Thus, any time a user wants to execute code that relies on a pre-existing object's operation, the user needs to ensure that the code can access the possibly disparate objects from different sources and that the objects are properly running when the code is executed.

As a result, a user may need to exert significant time and effort into setting up a computing environment (e.g., by defining a project and/or by adding correct dependencies for the objects) to run the code. Conducting even simple tasks that rely on running objects may thus take a disproportionate amount of time. Such tasks may include testing code, modifying code, and learning an application program interface (API).

One approach for executing code that relies on a running object is to set up a limited environment to execute the code. This may include setting up a project, adding the right dependencies, entering the code, and then deploying the project. This approach, however, has several drawbacks. First, setting up the limited environment to perform a simple task can also take a disproportionate amount of time. Second, if the user makes even a slight change to the code, the user will need to redeploy the environment, thus wasting more computing resources. And if the change in code relies on additional objects that were not relied on before, then the user may need to set up and deploy a whole new environment having new dependencies for the additional objects. Finally, after finalizing the code in the limited environment, the user may need to set up a wholly different environment just to test the code.

There is thus a need for an improved process for executing code that invokes operations of objects.

SUMMARY

Embodiments consistent with the present invention relate to methods and systems for executing software programming code.

In one exemplary embodiment, a computer-implemented method is provided for executing programming code at a server that stores running objects to be used by the programming code. The method includes providing a code development console through which the programming code may be input at a remote terminal. The server may then receive the programming code inputted into the code development console. The programming code is executed by using operations of the running objects and an execution result of the programming code is transmitted to the remote terminal for display in the code development console.

In another exemplary embodiment, a computer-readable media is provided for storing a program for causing a computer to perform a method for executing programming code. The method includes providing a code development console through which programming code may be input at a remote terminal and receiving, at a server, the programming code inputted into the code development console. The server stores running objects to be used by the programming code. The programming code is executed by using operations of the running objects and an execution result of the programming code is transmitted to the remote terminal for display in the code development console.

In another exemplary embodiment, a server for executing programming code is provided. The server stores running objects to be used by the programming code. The server includes a dispatcher servlet for receiving a request from a remote terminal for a code development console through which the programming code may be input, for providing to the remote terminal the code development console in response to the request, and for receiving the programming code input by a user into the console. The server also includes a shell for processing a part of the programming code by invoking operations of the running objects specified by the programming code. The server also includes a command handler for preprocessing the programming code, for supplying one or more parts of the programming code to the shell, and for generating an execution result based on output received from the shell. The dispatcher servlet transmits the execution result to the remote terminal for display.

In another exemplary embodiment, a computer-implemented method for executing programming code at a server is provided, where the server stores running objects to be used by the programming code. The method includes displaying a code development console associated with the server and receiving programming code entered into the code development console. The method recites transmitting the received programming code to the server and receiving, from the server, an execution result from executing the programming code at the server based on the stored running objects. The execution result is then displayed in the code development console.

It is to be understood that both the foregoing general description and the following detailed description are exemplary and explanatory only, and are not restrictive of embodiments thereof, as claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate several embodiments of the invention and together with the description, serve to explain the invention. In the drawings.

DETAILED DESCRIPTION

Figure 1:
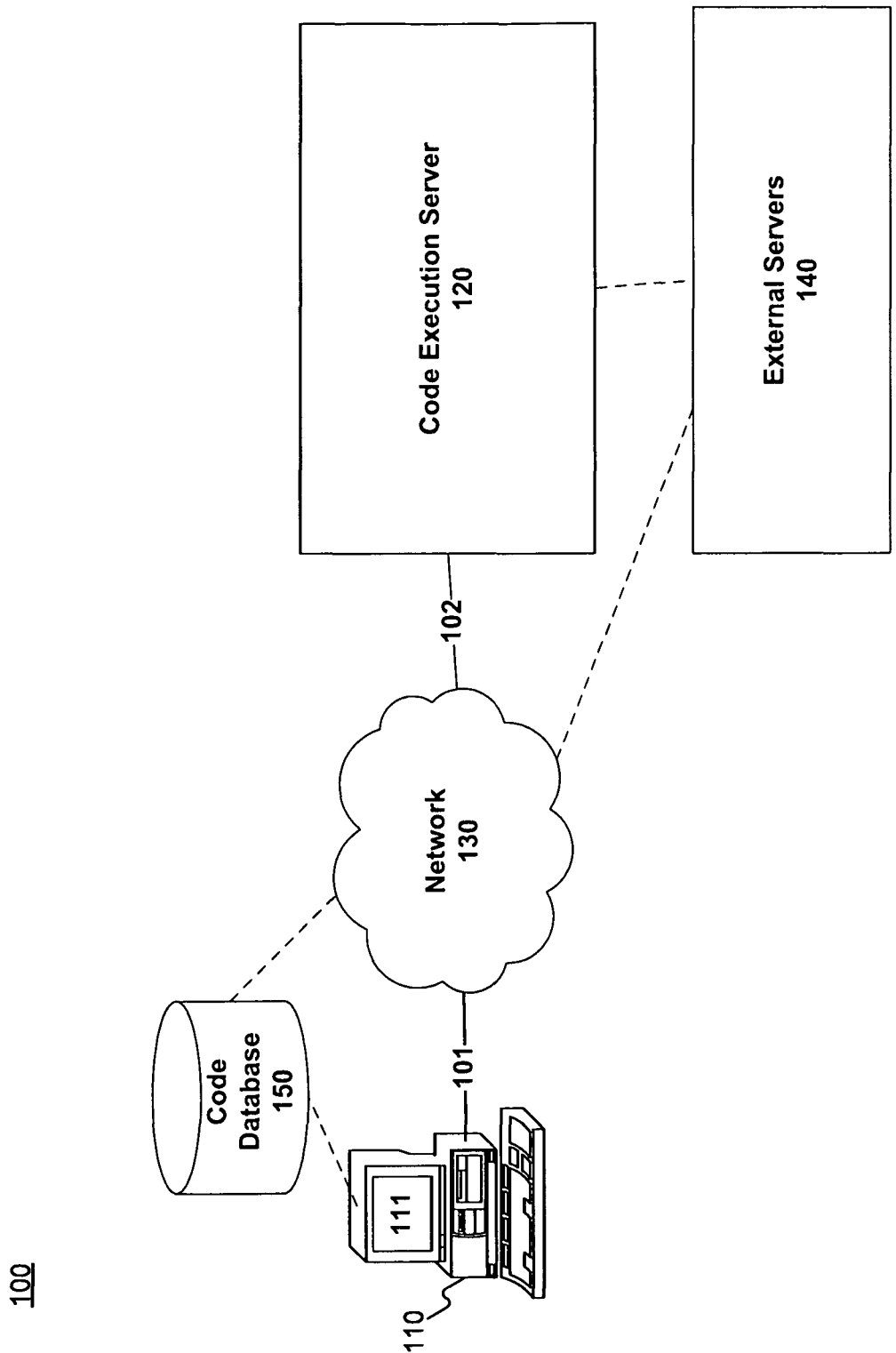
FIG. 1 is a block diagram illustrating an exemplary code development system consistent with a disclosed embodiment.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the disclosed embodiments. For example, substitutions, additions, or modifications may be made to the components illustrated in the drawings, and the exemplary methods described herein may be modified by substituting, reordering, or adding steps to the disclosed methods. Accordingly, the following detailed description does not limit the embodiments. Instead, the proper scope is defined by the appended claims.

Systems and methods consistent with the invention generally relate to executing code that invokes one or more objects. Exemplary embodiments allow a user to enter code at a workstation and execute the code at a remote server where objects invoked in the code are running. The invoked-objects may be existing objects that exist before the code is entered. For example, the user may predefine the objects as part of a project related to the entered code. The project may be a deployed software application, or an application currently under development, that may execute the code. However, in exemplary embodiments, the predefined objects may be initially defined for a variety of purposes. For example, the predefined objects may be defined: to test code and/or interact with other objects; to execute a project different than the project related to the entered code; as part of a collection (e.g. a library) of objects; or by a developer as part of a software package.

FIG. 1 is a block diagram illustrating the components of an exemplary code development system 100, consistent with a disclosed embodiment. As shown in FIG. 1, code development system 100 may include a code input workstation 110 and a code execution server 120, which may communicate with one another via a network 130. While FIG. 1 shows only one code input workstation 110, code development systems 100 consistent with the invention may include multiple code input workstations 110. Further, in some implementations, code development system 100 may also include external servers 140, connected to code execution server 120 either directly or via network 130. As also shown in FIG. 1, exemplary implementations of system 100 may also include a code database 150 connected to code input workstation 110 either directly or via network 130.

Code development system 110 may be used for object-oriented programming. For instance, code development system 110 may allow a user to enter software programming code that executes or calls methods of existing objects. The inputted code may be in any type of object-oriented programming language, such as Java or groovy language. The programming language used for the inputted code may be the same or different from the programming language used to define the existing objects. The existing objects running on code execution server 120 may be defined in different languages, such as Java, Groovy, or ABAP. The inputted code written in either Java or Groovy may call the existing objects written in the different languages.

Code input workstation 110 may be any type of computer or workstation including one or more processors for providing the user the ability to enter software programming code and to transmit the inputted code to code execution server 120 for execution. Code input workstation 110 may thus include one or more input devices (e.g., a keyboard or mouse) (not shown) for receiving the inputted code and other programming commands. The input devices may also include one or more display screens for displaying the code and other information to the user. Code input workstation 110 may also include a communication unit (e.g., a modem) for connecting to network 130 and transmitting and receiving information through network 130.

Code input workstation 110 may further include a console 111 displayed on workstation 110. A user may use console 111 to specify the particular server that the user wants to execute the inputted code. For instance, a user may enter a server address for code execution server 120 in console 111. In one embodiment, and as described in further detail below, console 111 may be implemented with a web browser and a user may enter the address of server 120 by entering a URL of server 120 in the browser. In such embodiments, code execution server 120 may then return a web application to run console 111 in response to the user entering the server address of server 120. The user may then input the software programming code in console 111 running on workstation 110. Code input workstation 110 may then transmit the inputted code through network 130 to code execution server 120. A user may also transmit a use case from code input workstation 110 to server 120. If a customer has a problem with executing certain code, the code may be the use case. The user, who may want to recreate the situation that the customer is experiencing, may execute the code by using the console to reproduce the situation by executing the use case at the server.

The user may also enter data (or source of data) to be used for the execution of the code and specify what landscape on server 120 should be used to execute the code. A landscape may be a group of objects used for a specific aspect of an application or project (e.g., database, user interface, application logic, etc.) or a group of different applications or projects. This may allow a user to define an exact landscape for a particular customer to execute a use case in the same landscape the customer is using. The data and the specification of groups may be entered through console 111. The data and the object specification may be transmitted along with the code to server 120.

Code execution server 120 may execute and/or compile code received from one or more code input workstations 110 via network 130. Code execution server 120 may execute the code based on the data and the specified landscape. Code execution server 120 may continuously execute running objects previously existing on server 120. The existing running objects may be for a certain project, part of a group of objects, or correspond to a deployed application. Running objects may be instances of classes, written in one or more object-oriented programming languages, such as Java, that are executed. Server 120 may thus execute the code, received from workstation 110, that may call the methods or functions of the running objects.

Server 120 may, however, also execute code that invokes objects not running on server 120, but running on other external servers 140. Similarly, the running objects on the code execution servers 120 may themselves invoke objects running on external servers 140. Accordingly, code execution server 120 may invoke objects running server 120 itself or on other external servers 140 to execute the inputted code. In exemplary embodiments, each of external servers 140 may execute a specific set of running objects.

Code execution server 120 may generate a result based on the execution and compiling of the code by code execution server 120. Code execution server 120 may transmit the result to code input workstation 110 through network 130. Console 111, displayed on the display screen of code input workstation 110, may then display the result received from server 120 via network 130. Accordingly, systems consistent with the invention allow code input workstation 110 to execute code without workstation 110 needing to run those objects invoked by the code.

Code execution server 120 may also store a log of code executed on server 120. The log may include information about the running objects executed on server 120. A user may use console 111 to monitor the log. The user may enter new code input through console 111, based on monitoring the log, to see how the behavior of server 120 and the results change based on the new code input.

Network 130 may include, alone or in any suitable combination, a telephony-based network, a local area network (LAN), a wide area network (WAN), a dedicated intranet, wireless LAN, the Internet, a wireless network, a bus, or any other communication mechanism. Further, any suitable combination of wired and/or wireless components and systems may implement network 130. Moreover, network 130 may be embodied using bi-directional, unidirectional, or dedicated communication links. Network 130 may also implement standard transmission protocols, such as Transmission Control Protocol/Internet Protocol (TCP/IP), Hyper Text Transfer Protocol (HTTP), Simple Object Access Protocol (SOAP), Remote Procedure Call (RPC), or other protocols.

As described above, code input workstation 110 may also include or connect to code database 150 for storing the inputted code. As shown in FIG. 1, code database 150 may connect to code input workstation 110 directly or through network 130. Code database 150 may be any type of computer-readable storage medium and may correspond to a different computer, a server with a database, or any other storage facility. Code database 150 may also be implemented as an internal or removable computer storage medium, such as a storage medium that internal to code input workstation 110.

Code database 150 may store the software code that a user of code input workstation 110 may enter through console 111. The user may retrieve the code from code database 150 to execute it, either initially or again, on code execution server 120. Code database 150 may also store any output or execution results of the code. Furthermore, as described in more detail below with respect to FIG. 7, code database 150 may generate and store an execution data table by adding the inputted code and corresponding results (and other pertinent information) to the table stored in code database 150. Code database 150 may transmit the information stored in the execution data table to code input workstation 110, and display the table on the display screen of code input workstation 110.

Code database 150 may also represent a cache of a web browser that is used to display console 111. The user may save the executed inputted code in the cache. The user may also assign a name to the executed inputted code. Console 111 may include a drop down list that displays the different names of the executed inputted codes saved in the cache and named by the user.

Figure 2:
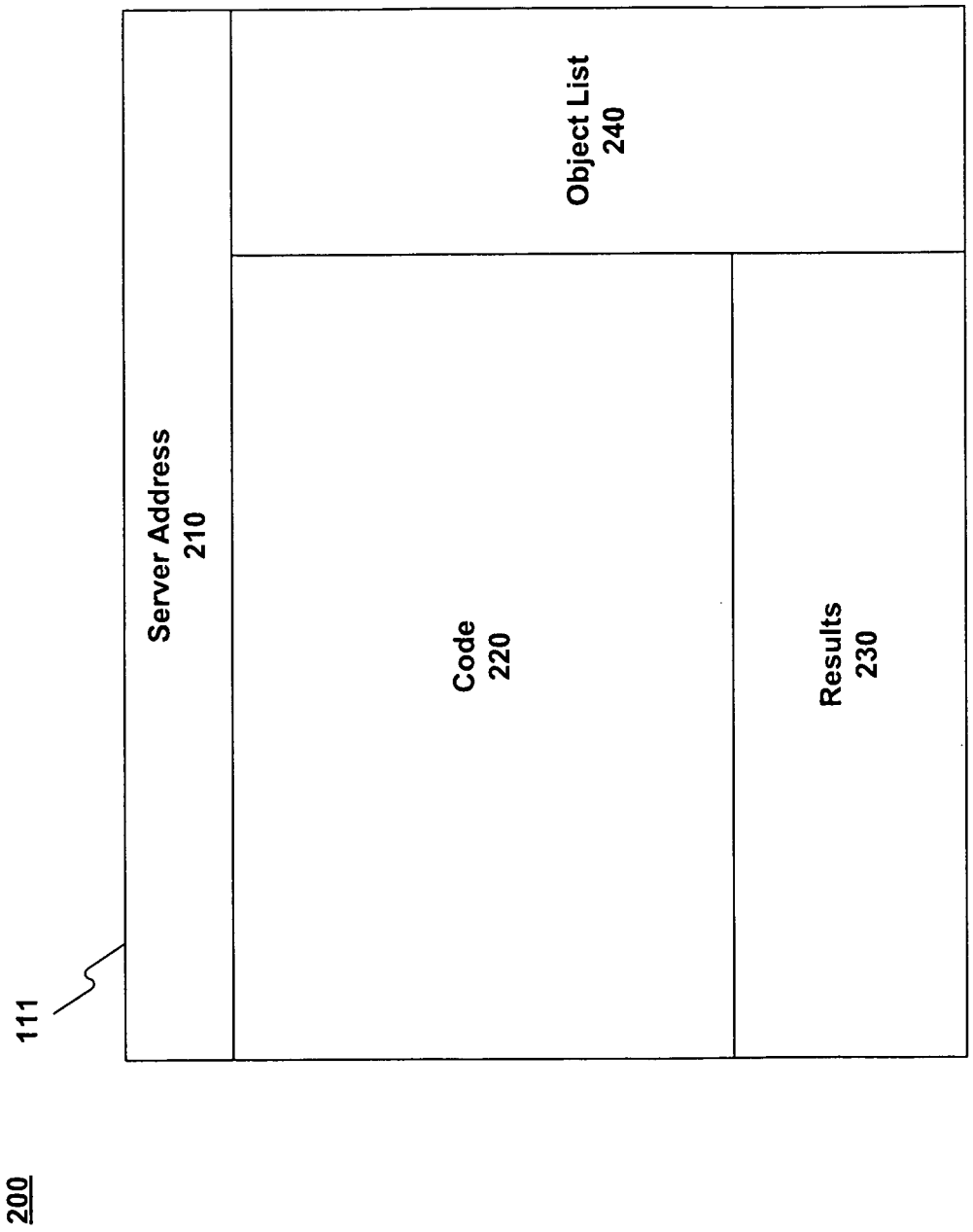
FIG. 2 illustrates an exemplary console consistent with a disclosed embodiment.

FIG. 2 illustrates an exemplary programming console 111 consistent with a disclosed embodiment. Console 111 may, for example, be displayed on a display screen of code input workstation 110 and may run as a web application in a web browser. Alternatively, console 111 may run in a software platform, such as Java Eclipse. As shown in FIG. 2, programming console 111 may include a server address area 210, a code input area 220, a results area 230, and an object list area 240.

Server address area 210 may display a server address of code execution server 120 that may communicate with workstation 110. For instance, when console 111 is displayed through a web browser, server address area 210 may be the part of browser through which a user enters a web address. A user may thus enter a URL address of server 130, and run console 111 as a web application in the web browser.

Code area 220 may display or be used for inputting software programming code. As described above, code input workstation 110 may then transmit the inputted code entered in code area 220 to code execution server 120. Results area 230 of console 111 may display any results from executing the code entered into or displayed by code area 220. As described above, code execution server 120 may transmit to workstation 110 the results displayed in result area 230.

Code input workstation 110 may also allow a user to modify the code entered into code area 220. For example, the user may still be modifying or developing the code displayed in code area 220. After the user has completed any desired modifications, code input workstation 110 may transmit the modified code to server 120 for execution. Code input workstation 110 may then display a new result, based on the execution of the newly modified code in code execution server 120, in result area 230.

Console 111 may also include an object list area 240 for displaying a list of objects that may be running or that are available on code execution server 120. The list of objects may be transmitted from code execution server 120 to be displayed in object list area 240, after code execution server 120 receives an indication that server 120 was specified in server address area 210 of console 111. The list of objects in object list area 240 may vary based on the particular server specified by console 111 (i.e., which server is specified in server address area 210). A user may thus refer to the list of objects in object list area 240 to determine which objects can be referred to in the code entered in area 220. The list of objects may be displayed in object list area 240 as part of a documentation document that is prepared for the particular server. Object list area 240 may also display the drop down list of the executed inputted codes saved in the cache by the user.

Figure 3:
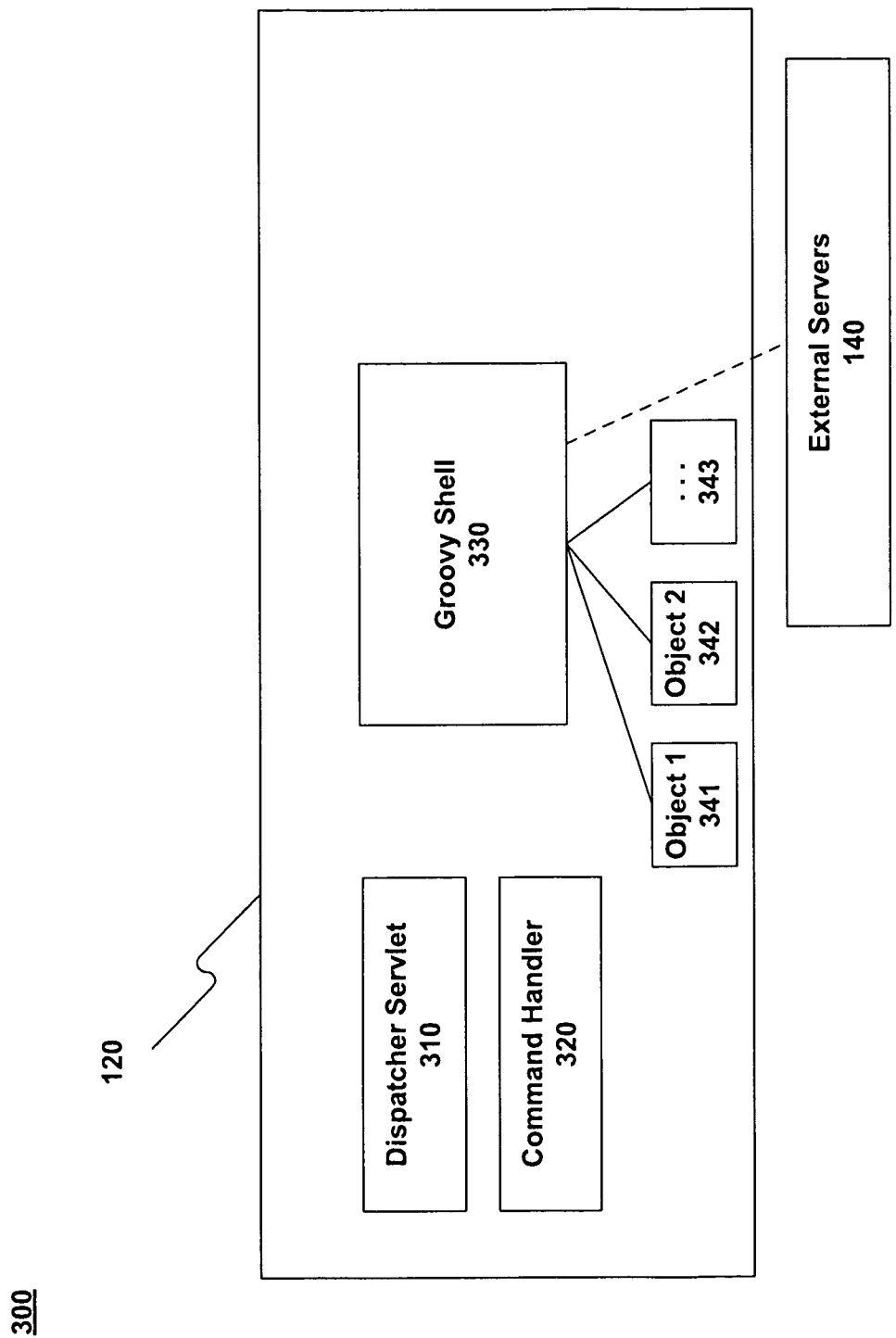
FIG. 3 is a block diagram illustrating an exemplary server consistent with a disclosed embodiment.

FIG. 3 is a block diagram illustrating exemplary code execution server 120 consistent with a disclosed embodiment. As shown in FIG. 3, code execution server 120 may include a dispatcher servlet 310, a command handler 320, a groovy shell 330, and one or more running objects 341, 342, 343. While FIG. 3 shows three running objects 341-343, systems and methods consistent with the invention may have any number of objects and applications running on server 120. As also shown in FIG. 3, and as described above with respect to FIG. 1, code execution server 120 may connect to one or more external servers 140.

Dispatcher servlet 310 handles the interaction of code execution server 120 with code input workstation 110. Dispatcher servlet 310 may receive a request from code input workstation 110 through an HTTP for connection to code execution server 120. The request may be to run console 111 as a web application at code input workstation 110. Since console 111 may correspond only to a specific execution server 120, dispatcher servlet 310 may thus transmit console 111 to code input workstation 110. In one embodiment, console 111 may be downloaded as a web page in the browser of code input workstation 110. In another embodiment, dispatcher servlet 310 may transmit a program to workstation 110 to run console 111 at workstation 110. Dispatcher servlet 310 may then receive code entered by a user at code input workstation 110 into the code area 220 of console 111.

Command handler 320 may process code received by dispatcher servlet 310 and compiles code output based on the execution of the code. Command handler 320 may receive the code from dispatcher servlet 310. Command handler 320 may then interpret the commands specified in the code, perform appropriate initialization, and call the groovy shell 330 to execute the proper commands based on the code. As described below, command handler 320 may then transmit segments of code to groovy shell 330.

Groovy shell 330 invokes operations specified in the code processed by command handler 320. Groovy shell 330 may interpret the code provided to it by the command handler 320. The interpreting may include determining which operations of running objects 341, 342, 343 need to be invoked to execute the code. Groovy shell 330 may then call at least one running object 341, 342, 343 and invoke an operation of the running object to execute the code. Groovy shell 330 may deal with code written in groovy language. Groovy shell 330 may be any available open-source project to process (e.g., compile) code written in groovy language. In an alternate embodiment, groovy shell 330 may be replaced with a different shell for compiling scripting code written in a different language. For example, groovy shell 330 may be replaced with a shell for compiling Java Script. Groovy shell 330 may also be replaced with a shell that is able to recognize scripting code written in different languages and deal with the code appropriately, as a shell for the particular language of the scripting code.

Groovy shell 330 may then return the execution result to command handler 320. In this regard, command handler 320 may receive output from groovy shell 330 and compile the execution result. Command handler 320 may then pass the result to dispatcher servlet 310. Dispatcher servlet 310 may receive the result from command handler 320 and convert the result into an HTTP response for transmission to console 111 for display in results area 230.

A user may also individually start, stop, and restart objects and applications 341, 342, 343 running on server 120 using code input workstation 110 through console 111. This may allow a user to isolate individual objects and applications 341, 342, 343 that user wants to start, stop, or restart without having to restart a large set of applications or the whole server 120. A user may want to start and stop individual objects and applications 341, 342, 343, for example, to recreate the exact landscape of the customer environment on server 120. A user may want to restart individual objects and applications 341, 342, 343, for example, when an individual object or application 341, 342, 343 is not executing properly on server 120.

Figure 4:
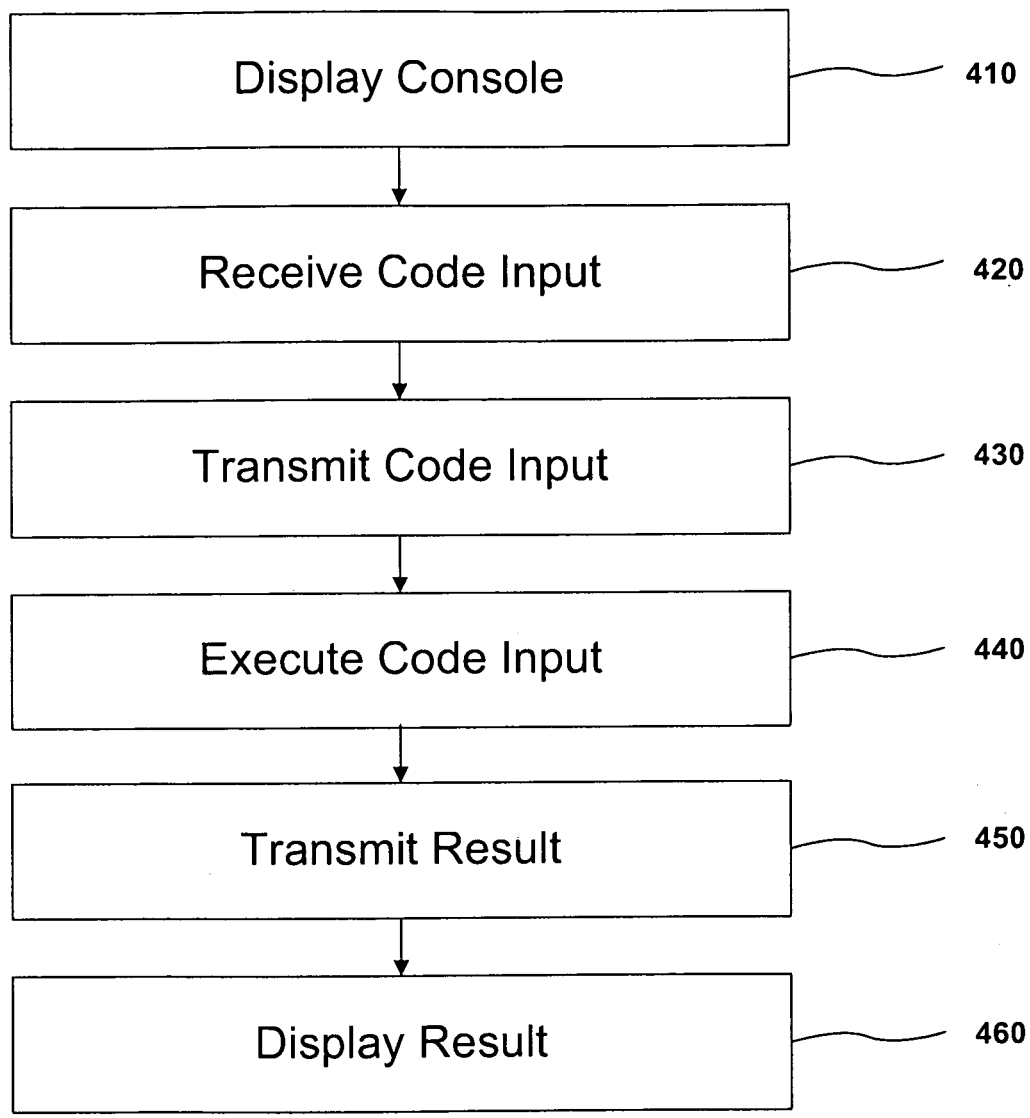
FIG. 4 is a flowchart of an exemplary code development process consistent with a disclosed embodiment.

FIG. 4 is a flowchart of exemplary code development process 400, consistent with a disclosed embodiment, for implementation by code development system 100. In step 410, system 100 may provide a display console 111 through which a user may input code at workstation 110. Code input workstation 110 may display console 111 through a web browser or a software development platform. For instance, as described above, code input workstation 110 may transmit, to code execution server 120, a request for a console that corresponds to server 120. In one embodiment, the request may be a server address for server 120 that a user enters into server address area 210. In response, dispatcher servlet 310 of code execution server 120 may transmit, to code input workstation 110, a web application for console 111. In another embodiment, code input workstation may download the console as a web page in a browser.

In step 420, code input workstation 110 may receive inputted code from a user. The user may enter the code into code input area 220 of console 111. In exemplary implementations, the user may also specify a group or groups of objects corresponding to a specific aspect of an application (e.g., database, user interface, application logic, etc.) that should be used to execute the inputted code. In step 430, code input workstation 110 may transmit the inputted code and any specified objects to code execution server 120 through network 130. Dispatcher servlet 310 of code execution server 120 may then receive the inputted code and specified objects from code input workstation 110.

In step 440, code execution server 120 may then execute the inputted code by invoking each of the operations specified by the inputted code. Code execution server 120 may invoke each specified operation by using the running objects 341-343, which may have been specified by the user as part of step 420. More specifically, groovy shell 330 of server 120 may invoke the operations by calling the operations of objects 341-343 running on code execution server 120 or external servers 140. Command handler 320 of code execution server 120 may generate a result based on the execution of the inputted code. Dispatcher servlet 310 of code execution server 120 may also convert the result into a special format for transmitting it to workstation 110 over network 130. The result may need to be converted to a special format to be properly transmitted over a network and displayed in console 111 of workstation 110. For example, if console 111 is displayed as a web page in a web browser, the result may need to be converted to an HTML format to be properly displayed in the browser. If console 111 is displayed in a software application development platform, the result may need to be converted to a format that can be interpreted by the platform on workstation 110.

In step 450, dispatcher servlet 310 may transmit the result from code execution server 120 to code input workstation 110 via network 130. In step 460, code input workstation 110 may display the result in results area 230 of console 111. In exemplary implementations, after receiving a result in step 460, the user may prompt workstation 110 to transmit new or modified code to server 120, so that server 120 may further process the received result by invoking different objects executed on server 120.

In exemplary embodiments, the user may also enter data (or source of data) with the inputted code in console 111 as part of step 420. In such embodiments, code input workstation 110 may transmit the data with the inputted code to server 120 in step 430. Server 120 may then execute the inputted code based on the data in step 440.

Figure 5:
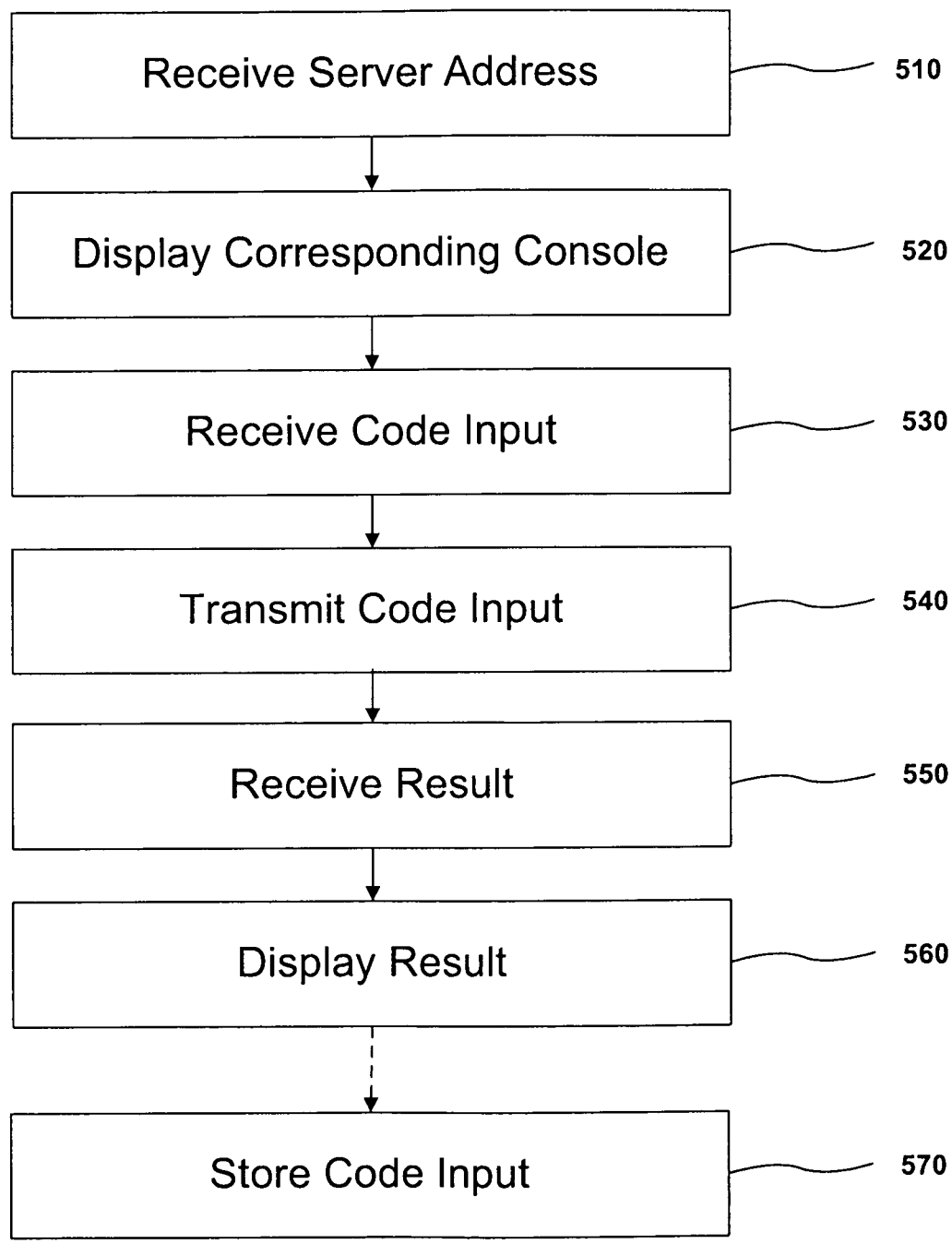
FIG. 5 is a flowchart of an exemplary code input process consistent with a disclosed embodiment.

FIG. 5 is a flowchart of exemplary code input process 500, consistent with a disclosed embodiment, and which may be performed by code input workstation 110. Code input process 500 also provides further details on aspects of code development process 400 described above. For example, steps 410, 420, 430, and 460 of process 400 generally relate to one or more steps of process 500.

In step 510, code input workstation 110 may receive input of a server address from a user into server address area 210. Code input workstation 110 may then retrieve a web application from code execution server 120, specified by the server address, and run the web application as console 111.

In step 520, code input workstation 110 may display console 111 on a display screen of code input workstation 110. Console 111 may be displayed in a web browser, where the user entered the server address (URL) of code execution server 120. The displaying of console 111 may include displaying names of objects running on code execution server 120 in object list area 240 of console 111. Code execution server 120 may transmit the names of the objects to be displayed in object list area 240 to code input workstation 110.

In step 530, code input workstation 110 may receive inputted code from a user. The user may enter the inputted code into code area 220 of console 111. The user may use operations of objects listed in object list area 240 in the inputted code. Code input workstation 110 may load documentation particular to code execution server 120. The documentation may include operations of objects running on code execution server 120. Console 111 may allow the user to view the names of the operations by opening the documentation in object list area 240.

In step 540, code input workstation 110 may transmit the inputted code to code execution server 120 for code execution server 120 to execute the inputted code. In step 550, code input workstation 110 may receive result of execution of the inputted code from code execution server 120.

In step 560, code input workstation 110 may display the result in results area 230 of console 111. In step 570, a user may prompt workstation 110 to store inputted code. The inputted code may be stored in database 150. Step 570 may be performed at any time after step 530 in method 500.

Figure 6:
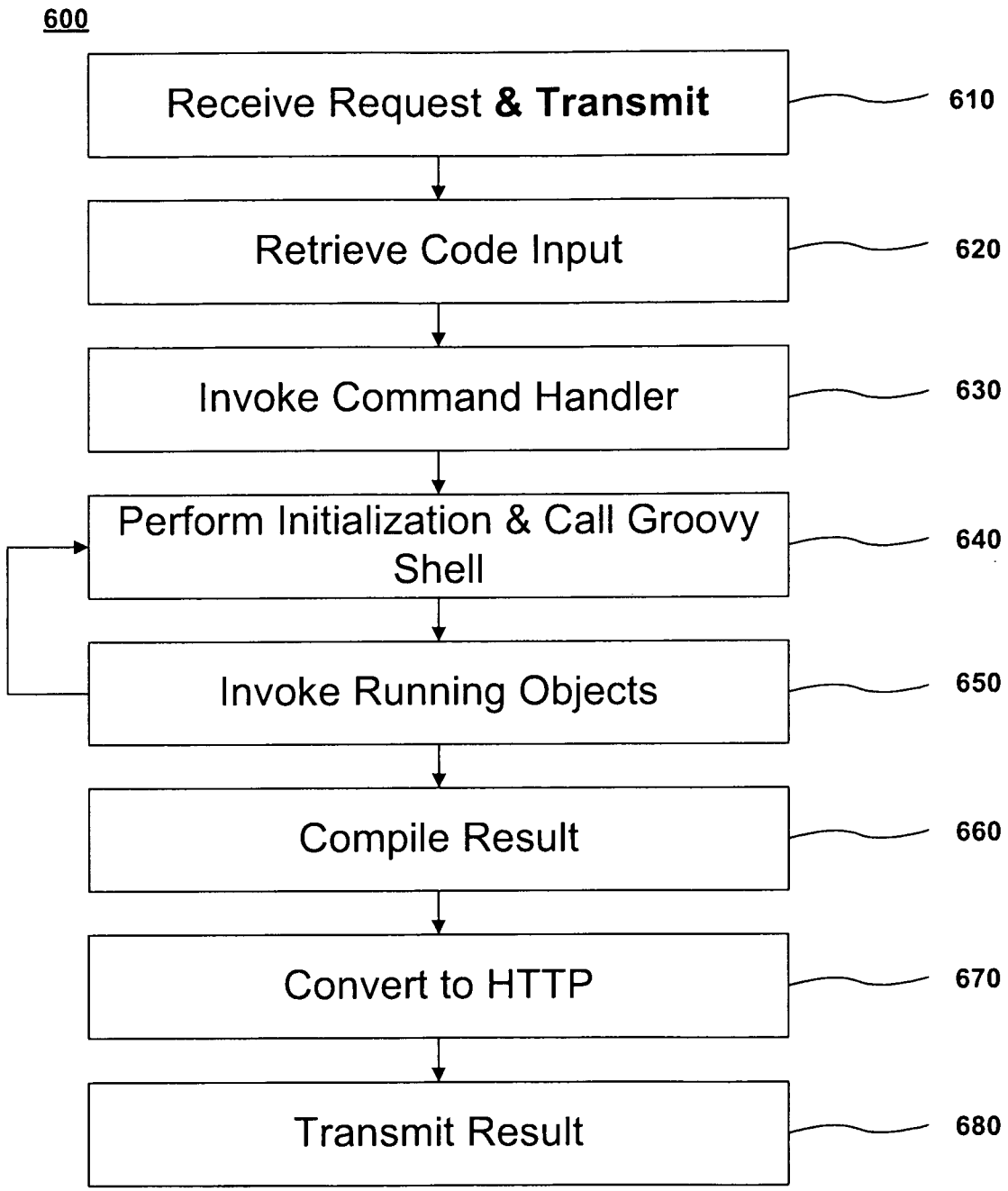
FIG. 6 is a flowchart of an exemplary code execution process consistent with a disclosed embodiment.

FIG. 6 is a flowchart of an exemplary code execution process 600, consistent with a disclosed embodiment, and which may be performed by code execution server 120. Code execution process 600 also provides further details on aspects of a code development process 400 described above. For example, steps 440 and 450 of process 400 generally relate to one or more steps of process 600.

In step 610, code execution server 120 may receive a request from a browser displayed by workstation 110 to execute inputted code using code execution server 120. Code execution server 120 may transmit a web application to display a console in a browser of workstation 110. Code execution server 120 may use the console to receive input entered by a user at workstation 110.

In step 620, code execution server 120 may retrieve inputted code from the console of workstation 110. In step 630, code execution server 120 may execute command handler 320 to execute the inputted code. Command handler 320 may preprocess the inputted code.

In step 640, command handler 320 may perform the necessary preprocessing (including initialization) and call groovy shell 330 based on the preprocessing. In step 650, groovy shell 330 may invoke operations of objects specified in the code segment passed to it by command handler 320. Groovy shell 330 returns the result of the invoking the objects and executing the code back to command handler 320. Steps 640 and 650 may repeat for each segment of the inputted code that command handler 320 passes to the groovy shell 330.

In step 660, code execution server 120 may compile the outputs from groovy shell 330 into a result for the execution of the inputted code. In step 670, code execution server 120 may convert the result to a HTTP format to transmit and display the result in the console displayed in the web browser of code input workstation 110. Alternatively, step 670 may be not be executed and the console may handle the formatting. In step 607, code execution server 120 may transmit the result to code input workstation 110.

Figure 7:
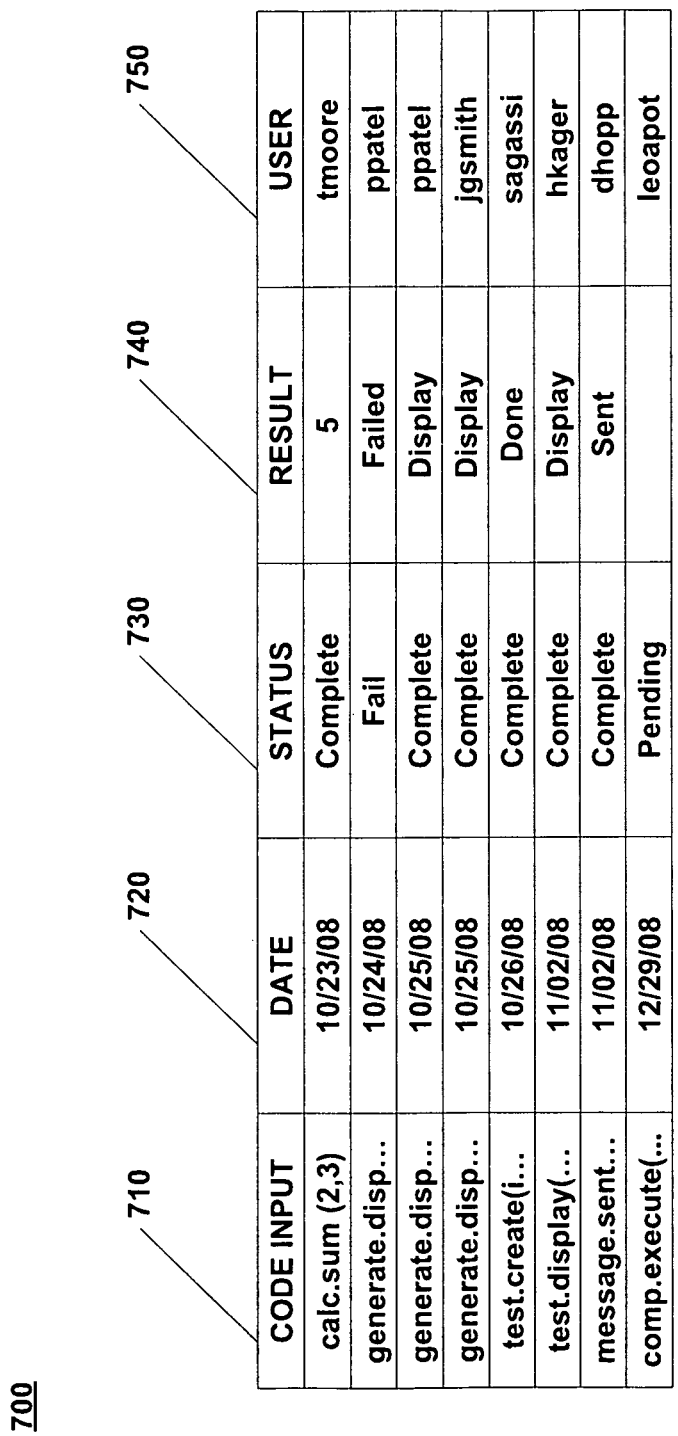
FIG. 7 illustrates an exemplary execution data table consistent with a disclosed embodiment.

FIG. 7 illustrates an exemplary execution data table 700 consistent with a disclosed embodiment. As described in more detail below, code development system 100 may generate table 700 for use in developing code in system 100.

Referring to FIG. 7, table 700 may include multiple columns having information about an instance of execution of the software code, and each row may correspond to a separate instance of execution of the software code. For instance, as shown in FIG. 7, table 700 may include a code input column 710, a date column 720, a status column 730, a result column 740, and a user column 750. Systems consistent with the invention, however, may not include all of columns 710 to 750, or may include different or additional columns.

Code development system 100 may use table 700 for, among other things, to track the testing of different versions or executions of the software code. This allows different users at different workstations, including workstation 110, to track the activity of other users in interacting with code executions server 120. For instance, code input workstation 110 or code execution server 120 may generate and update table 700. A user may prompt workstation 110 to add information about the inputted code to table 700. Workstation 110 may also add information about the execution of the inputted code to table 700. Workstation 110 or code execution server 120 may then store a representation of table 700 in code database 150. A user may refer to table 700 to identify inputted code and re-execute the inputted code at a later date than originally executed. Workstation may add information about the re-execution of inputted code to table 700.

Execution data table 700 includes exemplary columns illustrating the type of information that system 100 may collect with respect to a code execution. For example, column 710 may display an identification (or representation) of a certain inputted code; column 720 may display a date of execution of the inputted code; column 730 may display status of execution by indicating whether the execution was successful or not (e.g., whether the server was able to execute the inputted code); column 740 may display a representation of a result of execution of the inputted code; and column 750 may display an identification of a user who entered the inputted code at workstation 110. If table 700 is generated and maintained by server 120, column 750 may identify the workstation that sent the inputted code.

As shown in FIG. 7, code execution server 120 may also return in table 700 information about the execution of an inputted code at server 120. In one embodiment, server 120 may also return an indication of the various processing steps of the executed code and a result of each executed processing step. In another embodiment, server 120 may also return an indication of any processing steps of the executed code that failed. In another embodiment, server 120 may transmit data to workstation 110 to create a visual representation of information associated with The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments may be implemented as a combination of hardware and software or in hardware alone. Examples of hardware include computing or processing systems, including personal computers, servers, laptops, mainframes, micro-processors and the like. Additionally, although aspects are described for being stored in memory, one skilled in the art will appreciate that these aspects can also be stored on other types of computer-readable media, such as secondary storage devices, for example, hard disks, floppy disks, or CD-ROM, or other forms of RAM or ROM.

Computer programs based on the written description and methods are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments have been described herein, the scope of thereof includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope of equivalents.

What is claimed is:

1. A computer-implemented method for executing programming code at a server, where the server stores running objects to be used by the programming code, the method comprising:
    providing a code development console through which the programming code and a specification of objects simulating a customer specific environment may be input at a remote terminal;
        wherein the code development console is a scripting console web application running in a browser; and
        wherein the specification of objects represents objects available on a customer computer system;
    receiving, at the server, the programming code and specification of objects inputted into the code development console;
    receiving a name for the programming code from a user of the remote terminal;
    generating electronic instructions to add the programming code to a cache of the browser, wherein the cache reflects the programming code identified by the name;
    generating electronic instructions to display the name to the user at the remote terminal;
    executing the programming code by using operations of the running objects specified to simulate the customer specific environment; and
    transmitting an execution result of the programming code to the remote terminal for display in the code development console.

2. The method according to claim 1, wherein the code development console is running in a software development platform.

3. The method according to claim 1, further comprising providing information about the running objects for display in the code development console at the remote terminal.

4. The method according to claim 1, further comprising receiving a data input at the remote terminal,
    wherein the executing further comprises executing the programming code based on the inputted data.

5. The method according to claim 1, wherein the executing further comprises:
    parsing the programming code;
    invoking operations of the running objects based on the programming code;
    compiling outputs of the invoked operations into the execution result; and
    converting the execution result into an HTTP response.

6. The method according to claim 1, further comprising:
    receiving selection of a selected inputted code in the cache from the user; and
    transmitting the selected inputted code to the server.

7. A non-transitory computer-readable medium storing a program for causing a computer to perform a method for executing programming code, the method comprising:
    providing a code development console through which programming code and a specification of objects simulating a customer specific environment may be input at a remote terminal;
        wherein the code development console is a scripting console web application running in a browser; and
        wherein the specification of objects represents objects available on a customer computer system;
    receiving, at a server, the programming code and specification of objects inputted into the code development console, wherein the server stores running objects to be used by the programming code;
    receiving a name for the programming code from a user of the remote terminal;
    generating electronic instructions to add the programming code to a cache of the browser, wherein the cache reflects the programming code identified by the name;
    generating electronic instructions to display the name to the user at the remote terminal;
    executing the programming code by using operations of the running objects specified to simulate the customer specific environment; and
    transmitting an execution result of the programming code to the remote terminal for display in the code development console.

8. The non-transitory computer-readable medium according to claim 7, wherein the method further comprises providing information about the running objects for display in the code development console at the remote terminal.

9. The non-transitory computer-readable medium according to claim 7, wherein the method further comprises:
    adding information about the execution of the programming code and the execution result to a log stored on the server; and
    providing a user at the remote terminal access to monitor the log through the console.

10. The non-transitory computer-readable medium according to claim 7, wherein the executing further comprises:
    parsing the programming code;
    invoking operations of the running objects based on the programming code;
    compiling outputs of the invoked operations into the execution result; and
    converting the execution result into an HTTP response.

11. The non-transitory computer-readable medium according to claim 9, wherein the method further comprises:
    receiving a new code input from the user, wherein the new code input is based on an executed code in the log; and
    transmitting the new code to the server.

12. A server for executing programming code, wherein the server stores running objects to be used by the programming code, the server comprising:

at least one memory storing instructions; and at least one processor executing the instructions to cause the server to provide:

a dispatcher servlet for receiving a request from a remote terminal for a code development console through which the programming code and a specification of objects simulating a customer specific environment may be input, for providing to the remote terminal the code development console in response to the request, and for receiving the programming code and specification of objects input by a user into the console;
wherein the specification of objects represents objects available on a customer computer system; and
wherein the code development console is a scripting console web application running in a browser, the dispatcher servlet further:
receiving a name for the programming code from a user of the remote terminal;
generating electronic instructions to add the programming code to a cache of the browser, wherein the cache reflects the programming code identified by the name; and
generating electronic instructions to display the name to the user at the remote terminal;
a shell for processing a part of the programming code by invoking operations of the running objects specified by the programming code and specification of objects; and
a command handler for preprocessing the programming code, for supplying one or more parts of the programming code to the shell, and for generating an execution result based on output received from the shell;
wherein the dispatcher servlet transmits the execution result to the remote terminal for display.

13. The server according to claim 12, wherein the preprocessing comprises parsing the programming code.

14. A computer-implemented method for executing programming code at a server, where the server stores running objects to be used by the programming code, the method comprising:
displaying a code development console associated with the server;
wherein the code development console is a scripting console web application running in a browser;
receiving programming code and a specification of objects simulating a customer specific environment entered into the code development console;
wherein the specification of objects represents objects available on a customer computer system;
receiving a name for the programming code from a user of the remote terminal;
generating electronic instructions to add the programming code to a cache of the browser, wherein the cache reflects the programming code identified by the name;
generating electronic instructions to display the name to the user at the remote terminal;
transmitting the received programming code and specification of objects to the server;
receiving, from the server, an execution result from executing, using at least the specified objects, the programming code at the server based on the stored running objects; and
displaying the execution result in the code development console.

15. The method according to claim 14, further comprising:
retrieving the code development console by specifying a URL of the server in a browser; and
displaying the code development console in the browser.

16. The method according to claim 14, further comprising:
receiving input data via the code development console; and
transmitting the input data with the received programming code to the server,
wherein the received execution result is based on the input data.

17. The method according to claim 14, further comprising:
receiving a use case and a landscape input from a customer, wherein the received programming code is the use case; and
transmitting the landscape input with the received programming code to the server,
wherein the received execution result is based on the use case and the landscape.

18. The method according to claim 14, further comprising:
receiving a command to start, stop, or restart only one or more of the running objects on the server; and
executing the command at the server.

* * * * *